(12) United States Patent
Matsuda et al.

(10) Patent No.: US 7,370,458 B2
(45) Date of Patent: May 13, 2008

(54) SPEED CONTROL SYSTEM FOR LAWNMOWER ENGINE

(75) Inventors: Hayato Matsuda, Wako (JP); Tomoki Fukushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 10/874,182

(22) Filed: Jun. 24, 2004

(65) Prior Publication Data

US 2004/0261386 A1 Dec. 30, 2004

(30) Foreign Application Priority Data

Jun. 26, 2003 (JP) ............................. 2003-183167

(51) Int. Cl.
*A01D 63/10* (2006.01)
(52) U.S. Cl. ............................. 56/10.2 G; 56/10.2 R; 56/10.8
(58) Field of Classification Search ................. 56/10.8, 56/10.2 R, 10.2 G, 10.5; 123/339.2
See application file for complete search history.

(56) References Cited

U.S. PATENT DOCUMENTS

| | | | | | |
|---|---|---|---|---|---|
| 2,639,569 | A | * | 5/1953 | Pasturczak | ..................... 460/6 |
| 3,044,238 | A | * | 7/1962 | Harkness | ..................... 56/11.8 |
| 4,487,002 | A | * | 12/1984 | Kruse et al. | ..................... 460/6 |
| 5,010,866 | A | * | 4/1991 | Ohata | ..................... 123/352 |
| 5,488,817 | A | * | 2/1996 | Paquet et al. | ............. 56/10.2 R |
| 5,651,341 | A | * | 7/1997 | Harada et al. | ........... 123/339.2 |
| 6,892,517 | B2 | * | 5/2005 | Adams et al. | ........... 56/10.2 R |

FOREIGN PATENT DOCUMENTS

JP  2003-111508  4/2003

* cited by examiner

*Primary Examiner*—Thomas B. Will
*Assistant Examiner*—Alicia Torres
(74) *Attorney, Agent, or Firm*—Westerman, Hattori, Daniels & Adrian, LLP.

(57) ABSTRACT

In a lawnmower engine speed control system having an actuator moving a throttle valve and a controller controlling operation of the actuator such that the engine speed becomes equal to a predefined desired engine speed, it is determined whether the lawnmower is under a mowing operation based on a value indicative of a load of the engine including an operation rate or output of the engine, the desired engine speed is changed based on a result of determination, thereby enabling to lower noise, to boost fuel efficiency, and to simplify operation by making manual regulation of engine speed unnecessary, while ensuring stable operation free from engine speed variance.

18 Claims, 6 Drawing Sheets

SPEED CONTROL SYSTEM FOR LAWNMOWER ENGINE

BACKGROUND OF THE INVENTION

1. Field of the Invention

This invention relates to a lawnmower engine speed control system.

2. Description of the Related Art

Lawnmowers equipped with an engine for powering one or more cutter blades disclosed, for example, in Japanese Laid-open Patent Application No. 2003-111508, are in wide use. In this type of lawnmower, the engine speed is generally controlled to the desired speed by a mechanical governor that mechanically regulates the degree of opening of the throttle valve in response to the engine load.

The mechanical governor operates to maintain the engine speed constant (at the desired speed) utilizing a state of equilibrium between the centrifugal force of revolving fly weights and the force of a spring. With this arrangement, it is impossible to set the desired engine speed during mowing operation (when grass is actually being cut and the engine load is higher than during idling) higher than the desired speed (idling speed) during non-mowing operation (when grass is not being cut and the engine load is low). This means that the desired speed during non-mowing has to be set at least as high as the desired speed during mowing. The lawnmower engine is therefore noisy and low in fuel efficiency during non-mowing operation.

Moreover, in cases where the engine speed is too high during non-mowing operation or too low during mowing operation, the operator has to manually regulate the engine speed. This complicates lawnmower operation and is liable to make stable operation impossible owing to variance of the engine speed.

SUMMARY OF THE INVENTION

This invention provides, in its first aspect, a lawnmower engine speed control system that during non-mowing operation lowers the desired speed to lower noise and boost fuel efficiency.

This invention provides, in its second aspect, a lawnmower engine speed control system that by making manual regulation of engine speed unnecessary simplifies operation and enables stable operation free from engine speed variance.

According to the first and second aspects, there is provided a system for controlling a speed of an internal combustion engine mounted on a lawnmower, comprising: an actuator moving a throttle valve installed at an air intake passage of the engine; a controller controlling operation of the actuator such that the engine speed becomes equal to a predefined desired engine speed; a determiner determining whether the lawnmower is under a mowing operation based on a value indicative of a load of the engine; and a desired engine speed changer changing the desired engine speed based on a result of determination.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

A lawnmower engine speed control system according to an embodiment of this invention will now be explained with reference to the drawings.

Figure 1:
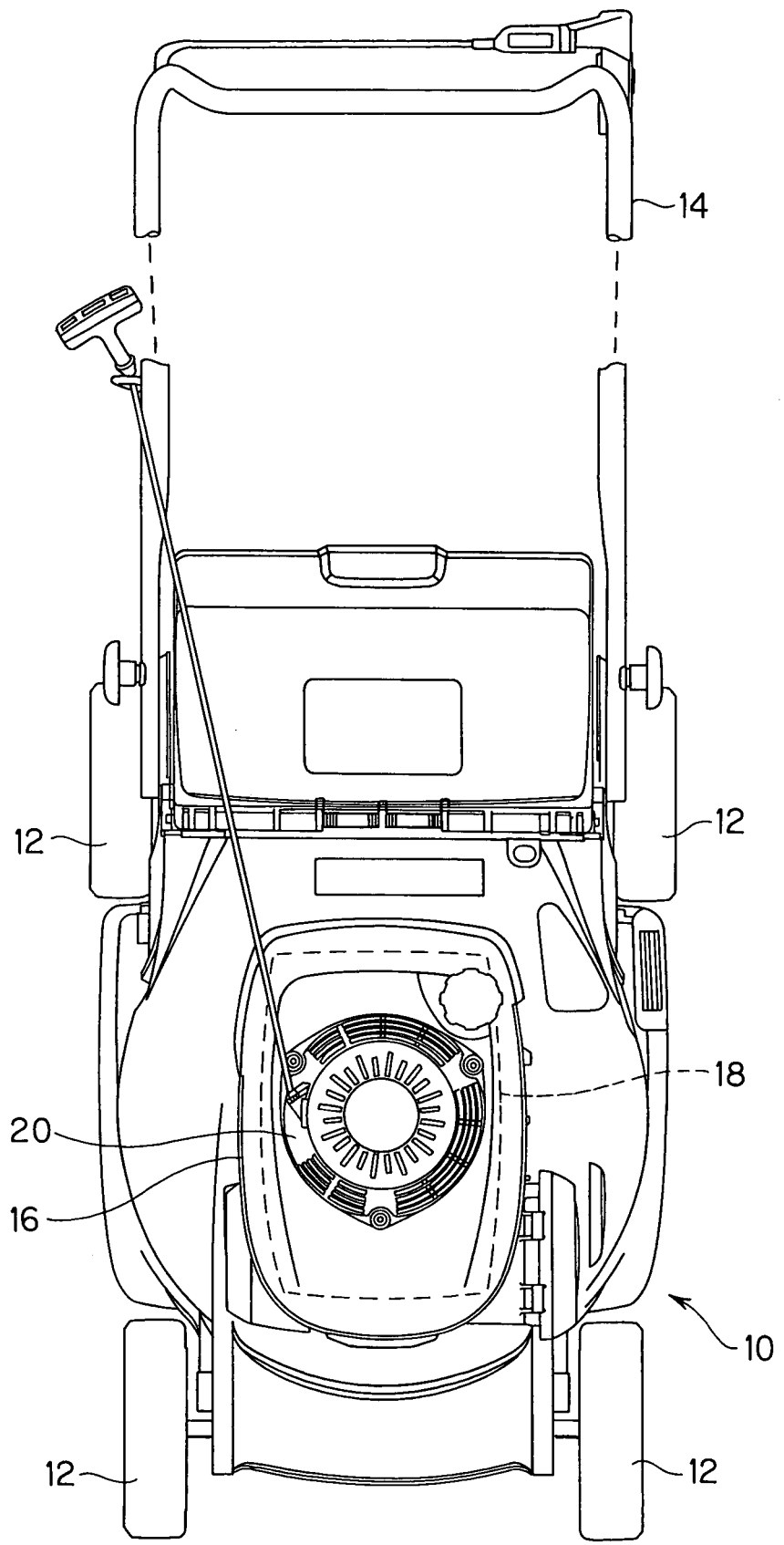
FIG. 1 is a top view of a lawnmower equipped with a lawnmower engine speed control system according to a first embodiment of the present invention.

FIG. 1 is a top view of a lawnmower equipped with a lawnmower engine speed control system according to this embodiment.

Symbol 10 in FIG. 1 designates the lawnmower. The lawnmower 10 is a push-type power lawnmower equipped with four wheels 12 and a handlebar 14. The lawnmower 10 is also equipped with a cutter blade (not shown) of circular shape as viewed from above and having cutting edges that face in the direction of rotation. An engine (mower engine) 18 for powering the cutter blade is mounted under an engine cover 16 installed on a frame supported on the four wheels 12. The engine 18 is equipped with a recoil starter 20 that the operator uses to start the engine 18 manually.

Figure 2:
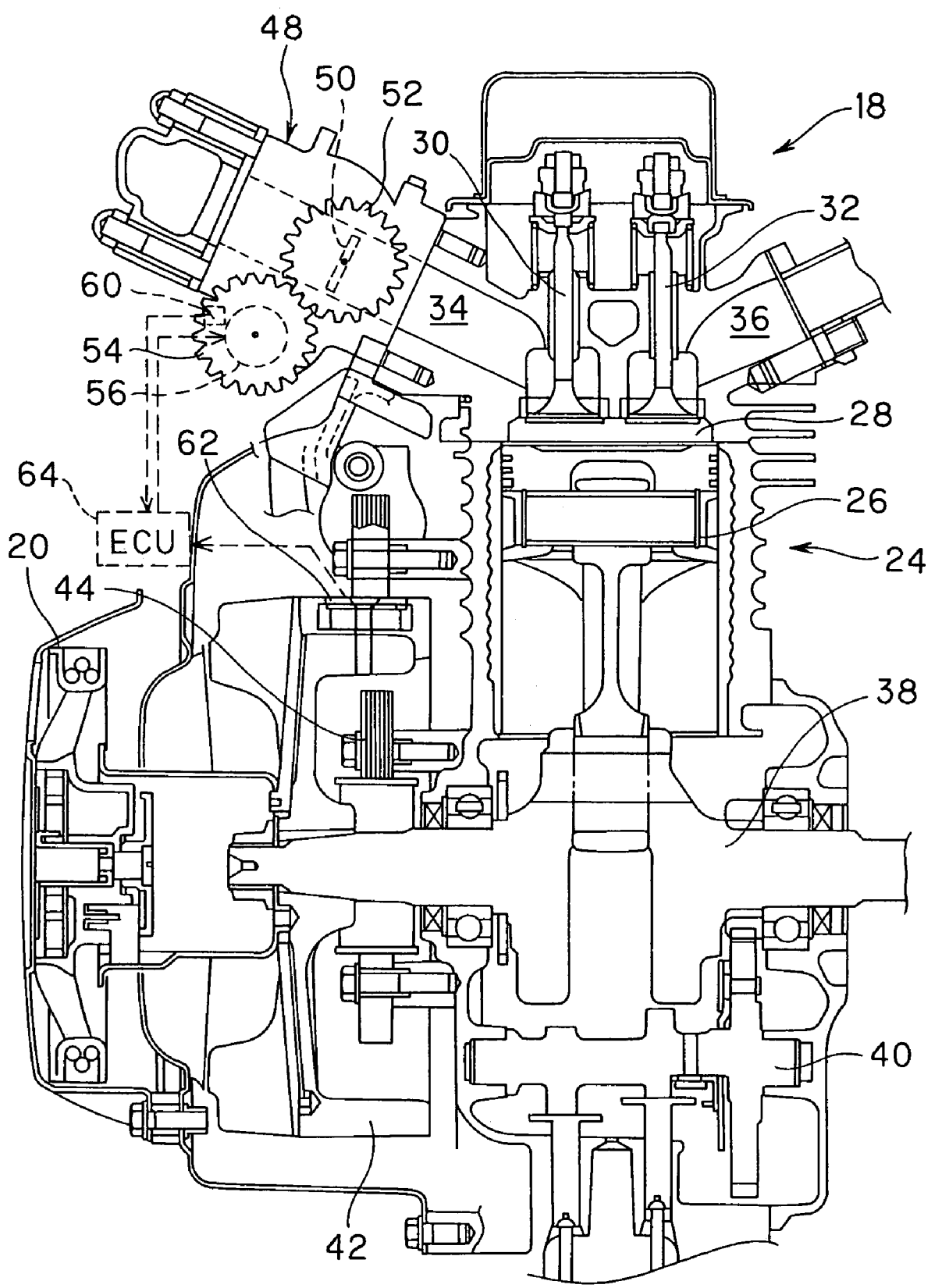
FIG. 2 is an overall schematic view of the lawnmower engine speed control system illustrated in FIG. 1.

FIG. 2 is an overall schematic view of the lawnmower engine speed control system of this embodiment.

As shown in FIG. 2, the engine 18 has a single cylinder 24 accommodating a piston 26 that reciprocates therein. A combustion chamber 28 is formed between the top of the piston 26 and wall of the cylinder. An intake valve 30 and an exhaust valve 32 are installed in the cylinder wall to open/close communication of the combustion chamber 28 with an air intake passage 34 and an exhaust passage 36. The engine 18 is a water-cooled, four-cycle, single cylinder OHV internal combustion engine with a displacement of 196 cc.

The piston 26 is connected to a crankshaft 38 that is connected through a gear to a camshaft 40. The crankshaft 38 is also connected to a flywheel 42. The recoil starter 20 is attached to the outer side of the flywheel 42. A magneto coil (alternator) 44 for generating AC current is installed inward of the flywheel 42. The AC current generated by the magneto coil 44 is converted to DC current by a processing circuit (not shown) and then supplied as operating current to an ECU (electronic control unit; controller; explained later), ignition circuit (not shown) and other devices.

A throttle body 48 that houses a throttle valve 50 is installed upstream of the air intake passage 34. The throttle valve 50 is connected through a first gear 52 and a second gear 54 to an electric motor 56 (stepping motor; actuator). A carburetor assembly (not shown) is installed in the throttle body 48 upstream of the throttle valve 50. The carburetor assembly is connected to a fuel tank (not shown) and produces an air-fuel mixture by jetting gasoline fuel into air drawn in at a flow rate determined by the degree of opening of the throttle valve 50. The produced air-fuel mixture is drawn into the combustion chamber 28 of the cylinder 24 through the throttle valve 50, intake passage 34 and intake valve 30.

A throttle position sensor 60 installed near the motor 56 outputs a signal proportional to the throttle valve opening or position θTH (hereinafter called "throttle opening"). A crankangle sensor 62 (constituted as an electromagnetic pickup) installed near the flywheel 42 outputs a pulse signal once every predetermined crankangle.

The ECU (now assigned with symbol 64) is installed in the lawnmower 10 near the engine 18. The ECU 64 is a microcomputer including a CPU, ROM and RAM and counter.

The outputs of the throttle opening sensor 60 and crankangle sensor 62 are input to the ECU 64. The ECU 64 counts the output pulses of the crankangle sensor 62 and calculates the engine speed NE.

The ECU 64 uses the calculated engine speed NE and the throttle opening θTH to calculate a current command for operating the motor 56 so as to make the engine speed NE equal to a desired engine speed NED. The calculated current command is output to the motor 56 to control the motor 56 accordingly.

Thus in this embodiment, the opening of the throttle valve 50 is controlled to control the engine speed NE by an electronic speed control system consisting of the throttle body 48, the ECU 64 and the sensors.

Figure 3:
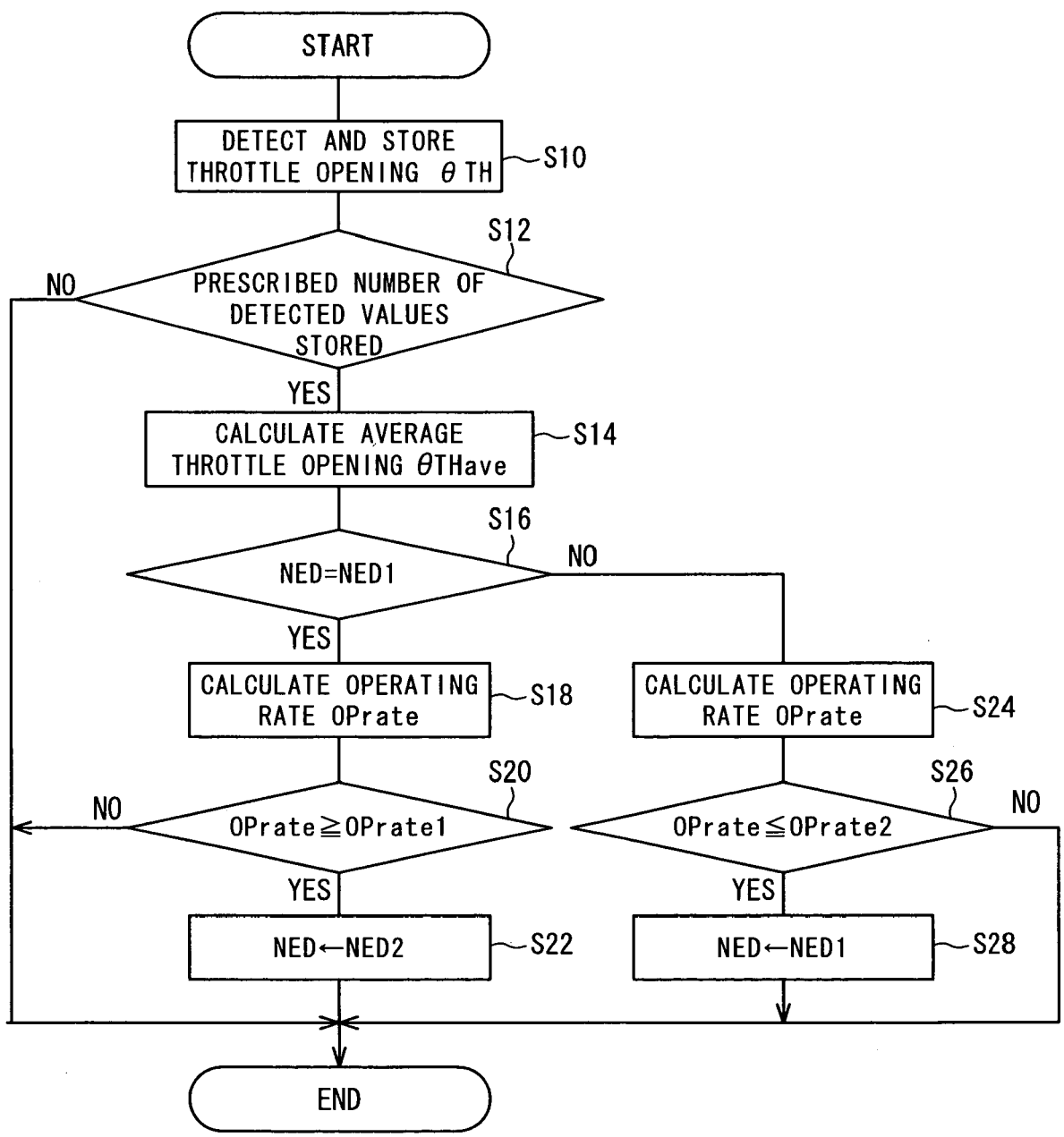
FIG. 3 is a flow chart showing the operation of the lawnmower engine speed control system illustrated in FIG. 2.

The operation of the lawnmower engine speed control system according to this embodiment will now be explained. FIG. 3 is a flow chart showing the flow of the operation. The illustrated program is executed once every 20 msec, for example.

First, in S10, the throttle opening θTH is detected and the detected value is stored in the RAM of the ECU 64. The RAM stores a prescribed number of detected throttle openings θTH (e.g., 10) in the order they are sequentially detected in successive executions of the program. Next, in S12, it is checked whether the prescribed of detected throttle openings θTH (10) has been stored.

When the result in S12 is NO, the remaining processing steps are skipped and the program is terminated. When the result in S12 is YES, the average throttle opening θTHave is calculated in S14. The average throttle opening θTHave is the average value of the prescribed number of throttle openings θTH (i.e., those stored over the past 10 programs cycles).

Next, in S16, it is checked whether the desired engine speed NED of the engine 18 is set to a first desired speed NED1 (idling speed, 2000 rpm in this embodiment). The desired engine speed NED is set to the first desired speed NED1 when the ECU 64 is activated. The explanation will therefore be continued assuming that the result in S16 is YES.

When the result in S16 is YES, the operating rate OPrate of the engine 18 is calculated or determined in S18. The operating rate OPrate is a value (parameter) representing engine load that is determined from the desired engine speed NED and the throttle opening θTHave.

Figure 4:
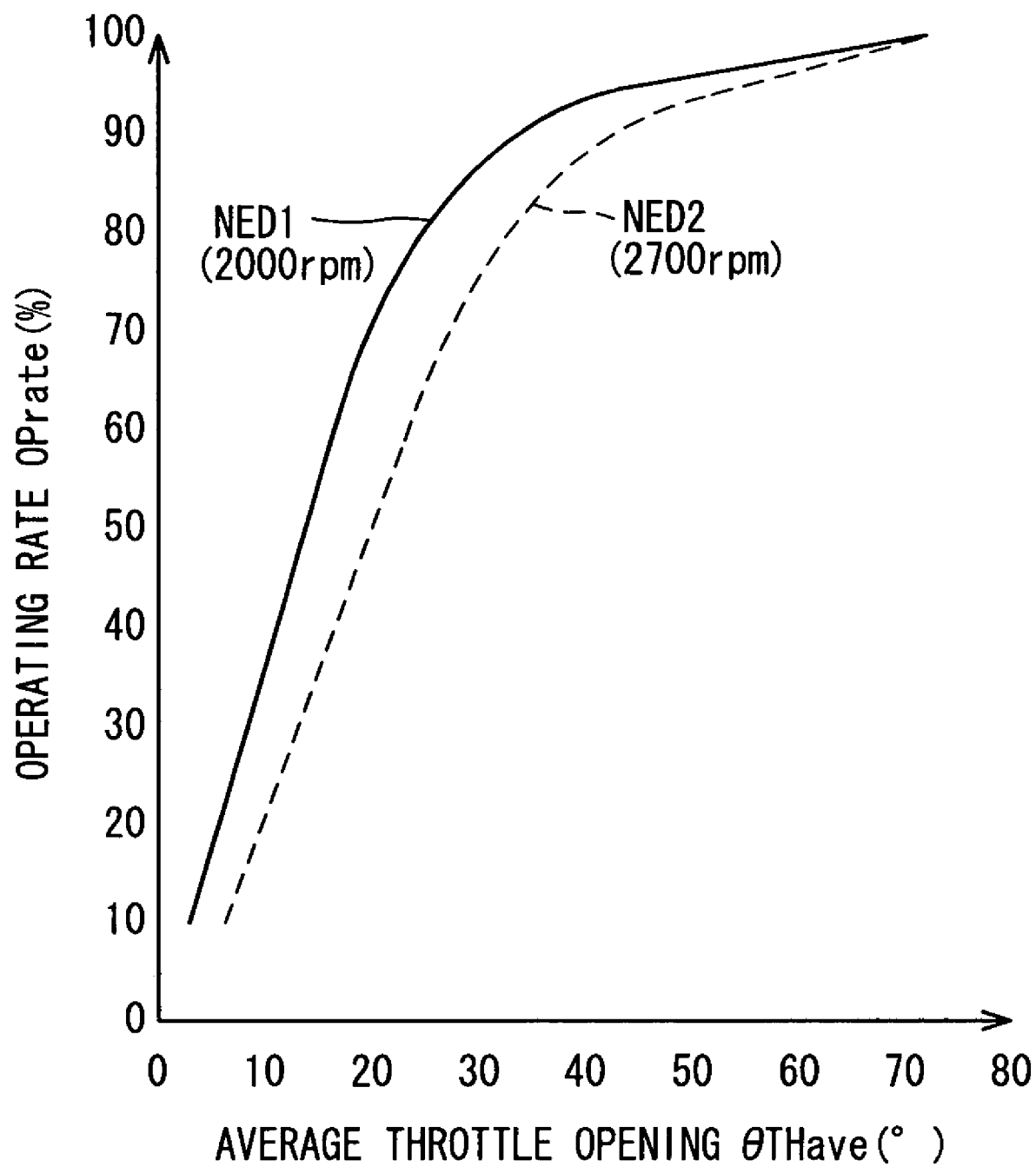
FIG. 4 is a graph showing the characteristic of an operating rate OPrate referred to in the flow chart of FIG. 3.

In S18, the value of the operating rate OPrate is acquired by retrieval from the characteristic map shown in FIG. 4 using the current first desired speed NED1 and average throttle opening θTHave as address data. As shown in FIG. 4, for a given engine speed, the value of the operating rate OPrate increases as the average throttle opening θTHave increases (becoming 100% at maximum throttle opening). In other words, the value of the operating rate OPrate increases in proportion as the engine load increases.

Next, in S20, it is checked whether the operating rate OPrate is equal to or higher than a first predetermined operating rate OPrate1 (30% or higher). When the lawnmower 10 is operated to actually cut grass, the motor 56 is operated in the direction of opening the throttle valve 50 so as to maintain the desired engine speed NED under the increased load on the engine 18. The value of the operating rate OPrate therefore increases when the lawnmower 10 is operated to cut grass. So the check made in S20 amounts to checking whether mowing is actually being conducted at an increased engine load.

When the result in S20 is NO (when the operating rate OPrate is lower than the first predetermined operating rate OPrate1, i.e., when it is found that mowing is not being conducted), the remaining processing step is skipped and the first desired engine speed NED1 is maintained. When the result in S20 is YES (when the operating rate OPrate is equal to or higher than the first predetermined operating rate OPrate1, i.e., when it is found that mowing is being conducted), the desired engine speed NED is changed to a second desired engine speed NED2 in S22. The second desired engine speed NED2 is set to an engine speed higher than the first desired speed NED1 that is optimum for mowing (the engine speed at which maximum torque is produced; 2700 rpm in this embodiment).

When the desired engine speed NED has been changed to the second desired engine speed NED2 in S22, the result in S16 in the next program cycle becomes NO, whereafter, in S24, the operating rate OPrate is calculated or determined by retrieval from the characteristic map shown in FIG. 4 using the current second desired engine speed NED2 and throttle opening θTH as address data.

Once the operating rate OPrate has been calculated or determined in S24, a check is made in S26 as to whether the determined operating rate OPrate is equal to or smaller than a second predetermined operating rate OPrate2 (20% or lower). This amounts to checking whether the engine load has decreased because mowing was stopped or interrupted.

When the result in S26 is NO (when the operating rate OPrate is higher than the second predetermined operating rate OPrate2, i.e. when it is found that mowing is being conducted), the remaining processing step is skipped and the second desired engine speed NED2 is maintained. When the result in S26 is YES, (when the operating rate OPrate is equal to or smaller than the second predetermined operating rate OPrate2, i.e., when mowing has been stopped or interrupted). the desired engine speed NED is changed to the first desired speed NED1 in S28.

Thus the lawnmower engine speed control system according to this embodiment is configured to judge whether or not the lawnmower 10 is engaged in a mowing operation (i.e., whether the engine load has increased compared with that during idling because the lawnmower 10 is actually cutting grass) and to change the desired engine speed NED based on the result of the judgment, specifically to set the desired engine speed NED to the first desired speed NED1 (idling speed) when the operating rate OPrate (value indicating engine load) determined from the desired engine speed NED and the average throttle opening θTHave is low and to change the desired engine speed NED to the second desired engine speed NED2 (engine speed higher than the first desired speed NED1 that is optimum for mowing) when the operating rate OPrate is high. The engine speed can therefore be lowered to reduce noise and boost fuel efficiency during non-mowing operation.

Moreover, the operator is not required to regulate the engine speed manually. The operation is therefore simplified and stable operation can be achieved because no variance in engine speed is caused by manual regulation.

Further, the lawnmower engine speed control system according to this embodiment is configured to judge that mowing is being conducted when the operating rate OPrate determined from the desired engine speed NED and the average throttle opening θTHave is equal to or higher than the first predetermined operating rate OPrate1 and to judge that mowing is not being conducted when the operating rate OPrate is equal to or lower than the second predetermined operating rate OPrate2. Whether or not mowing is being conducted can therefore be judged with high accuracy.

Another feature of this embodiment is that the average throttle opening θTHave is calculated first and the operating rate OPrate is then determined using the calculated value. This prevents frequent changing of the desired engine speed NED (hunting) during mowing that involves large load fluctuation.

A lawnmower engine speed control system according to a second embodiment of this invention will now be explained.

Figure 5:
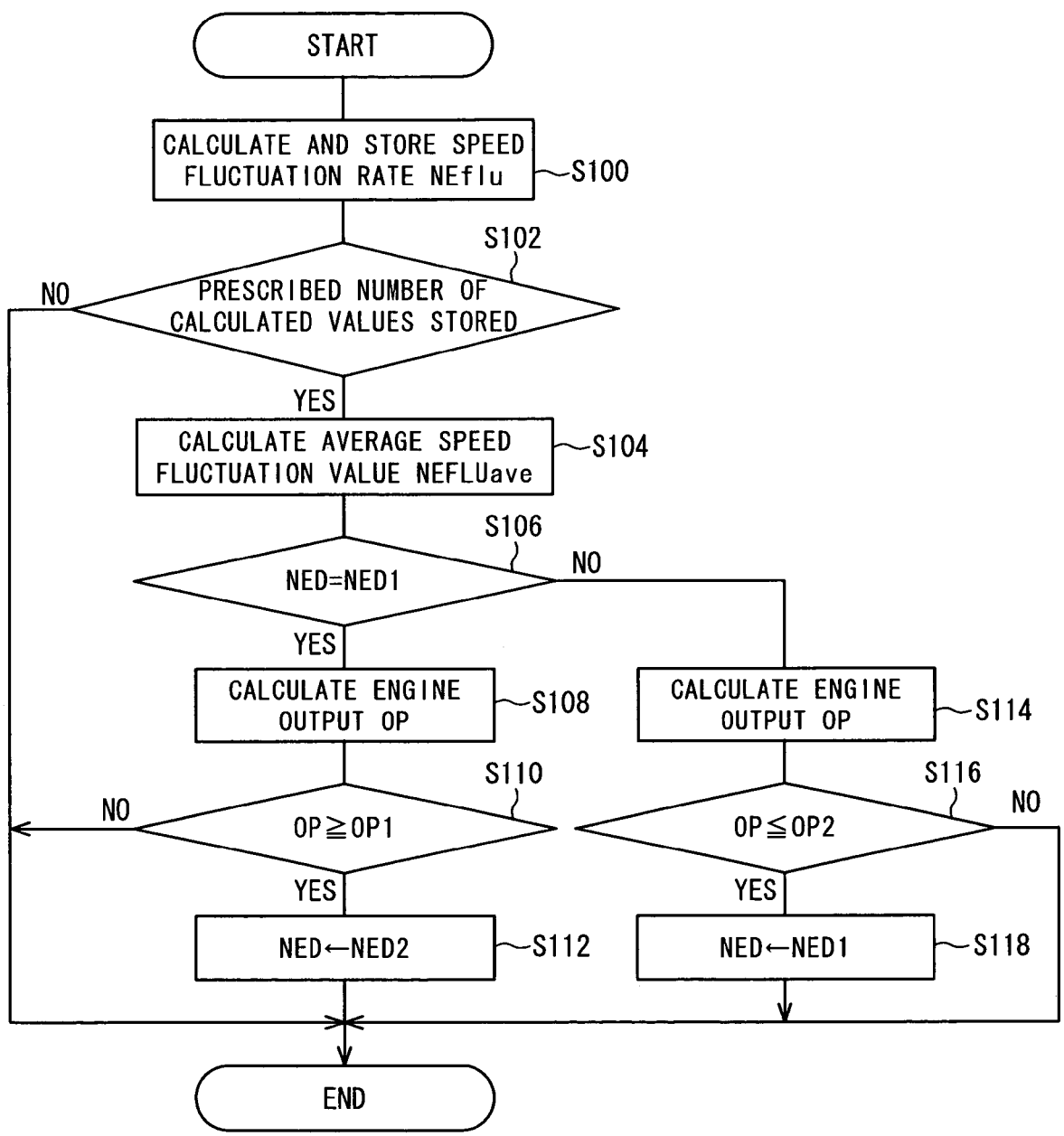
FIG. 5 is a flow chart, similar to FIG. 3, but showing the operation of a lawnmower engine speed control system according to a second embodiment of the present invention.

FIG. 5 is a flow chart similar to that in FIG. 3, but showing the flow of the operation of the lawnmower engine speed control system according to the second embodiment.

The explanation will be made focusing on the differences from the foregoing embodiment. In this embodiment, no operating rate OPrate is used and the judgment as to whether or not mowing is being conducted is instead made based on the engine output OP and desired engine speed NED.

Figure 6:
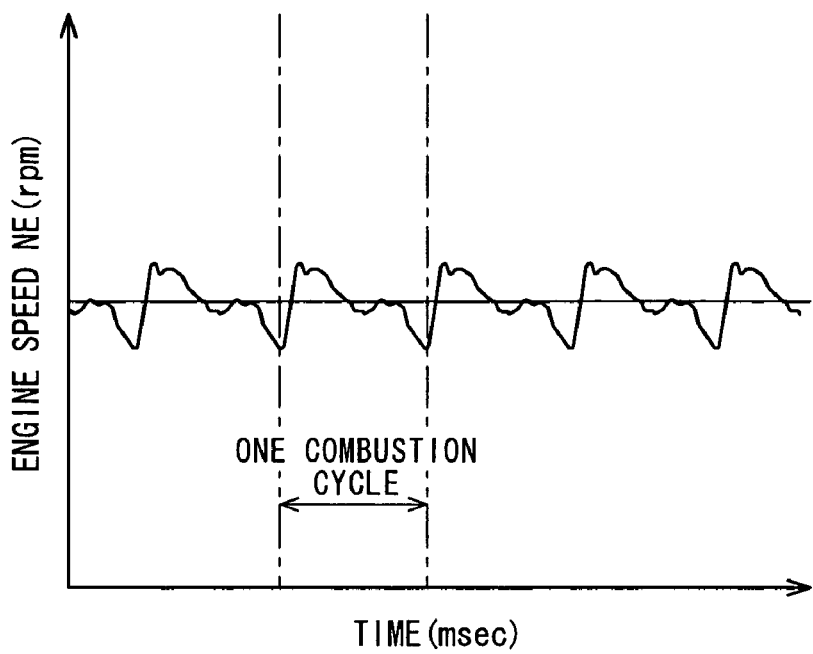
FIG. 6 is a time chart showing the fluctuation of speed of the engine shown in FIG. 1 during a single combustion cycle.

First, in S100, a speed fluctuation value NEflu indicating the speed fluctuation of the engine 18 is calculated and the calculated speed fluctuation value NEflu is stored in the RAM of the ECU 64. Since the engine 18 has only a single cylinder, the engine speed NE varies rather greatly during a single combustion cycle, particularly during the combustion and compression strokes, as shown in FIG. 6. In S100, the speed fluctuation value NEflu is acquired by calculating the difference between the highest and lowest engine speeds during one combustion cycle of the engine 18. A prescribed number (e.g. 20) of the speed fluctuation values NEflu calculated in successive executions of the program are stored in the RAM of the ECU 64 in the order calculated. At any given engine speed NE, the speed fluctuation value NEflu increases with increasing load of the engine 18.

Next, in S102, it is checked whether the prescribed number of calculated speed fluctuation values NEflu (20) has been stored.

When the result in S102 is NO, the remaining processing steps are skipped and the program is terminated. When the result in S102 is YES, the average speed fluctuation value NEFLUave is calculated in S104. The average speed fluctuation value NEFLUave is the average value of the prescribed number of speed fluctuation values NEflu (i.e., those stored over the past 20 programs cycles).

Next, in S106, it is checked whether the desired engine speed NED of the engine 18 is set to the first desired speed NED1 mentioned in the earlier embodiment (idling speed, 2000 rpm).

When the result in S106 is YES, the engine output OP is calculated or determined in S108. The engine output OP is a value (parameter) representing engine load that is calculated or determined from the desired engine speed NED and the average speed fluctuation value NEFLUave.

Figure 7:
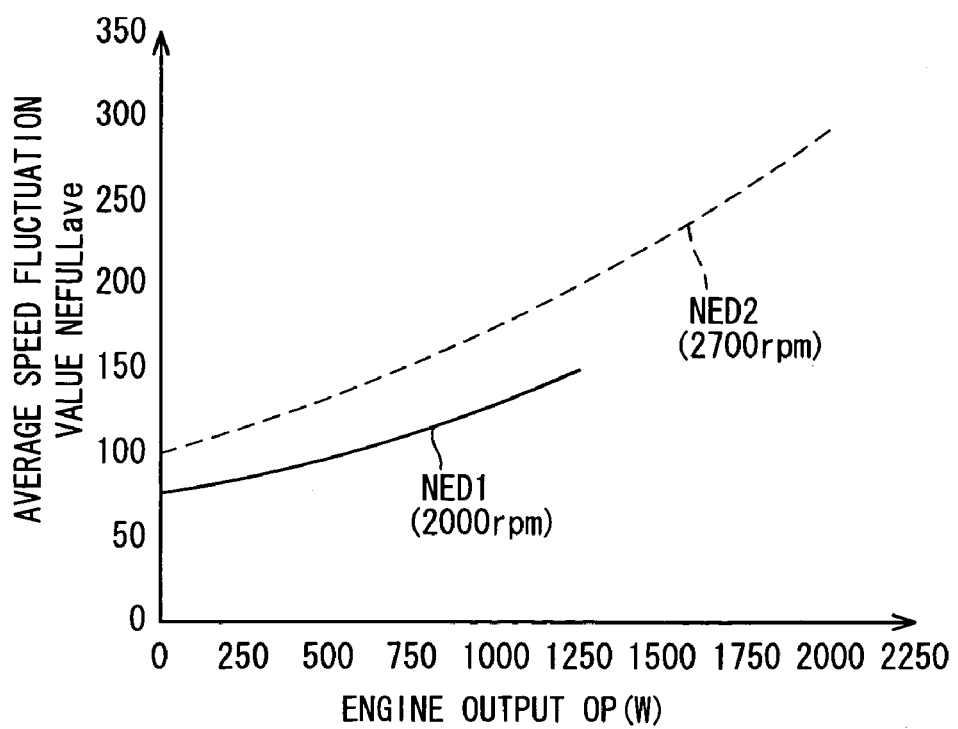
FIG. 7 is a graph showing the characteristic of an engine output OP referred to in the flow chart of FIG. 5.

The value of the engine output OP is acquired by retrieval from the characteristic map shown in FIG. 7 using the current desired speed NED1 and average speed fluctuation value NEFLUave as address data. As shown in FIG. 7, for a given engine speed, the value of the engine output OP increases as the average speed fluctuation value NEFLUave increases. In other words, the value of the engine output OP increases in proportion as the engine load increases.

Next, in S110, it is checked whether the engine output OP is equal to or greater than a first predetermined engine output OP1 (500 W), i.e., whether mowing is actually being conducted at an increased engine load.

When the result in S110 is NO (when the engine output OP is lower than the first predetermined engine output OP1, i.e., when it is found that mowing is not being conducted), the remaining processing step is skipped and the first desired speed NED1 is maintained. When the result in S110 is YES (when the engine output OP is equal to or greater than the first predetermined engine output OP1, i.e., when it is found that mowing is being conducted), the desired engine speed NED is changed to a second desired engine speed NED2 in S112. As explained with regard to the earlier embodiment, the second desired engine speed NED2 is an engine speed higher than the first desired speed NED1 that is optimum for mowing (2700 rpm).

When the desired engine speed NED has been changed to the second desired engine speed NED2 in S112, the result in S106 in the next program cycle becomes NO, whereafter, in S114, the engine output OP is calculated determined by retrieval from the characteristic map shown in FIG. 7 using the current second desired engine speed NED2 and average speed fluctuation value NEFLUave as address data.

Once the engine output OP has been calculated or determined in S114, a check is made in S116 as to whether the determined engine output OP is equal to or smaller than a second predetermined engine output OP2 (250 W or lower). This amounts to checking whether the engine load has decreased because mowing was stopped or interrupted.

When the result in S116 is NO (when the engine output OP is greater than the second predetermined engine output OP2, i.e. when it is found that mowing is being conducted), the remaining processing step is skipped and the second desired engine speed NED2 is maintained. When the result in S116 is YES, (when the engine output OP is smaller than the second predetermined engine output OP2, i.e., when mowing has been stopped or interrupted). the desired engine speed NED is changed to the first desired speed NED1 in S118.

Thus the lawnmower engine speed control system according to this embodiment is configured to judge whether or not the lawnmower 10 is engaged in a mowing operation (i.e., whether the engine load has increased compared with that during idling because the lawnmower 10 is actually cutting grass) and to change the desired engine speed NED based on the result of the judgment, specifically to set the desired engine speed NED to the first desired speed NED1 (idling speed) when the engine output OP (value indicating engine load) determined based on the desired engine speed NED and the average speed fluctuation value NEFLUave is small and to change the desired engine speed NED to the second desired engine speed NED2 (engine speed higher than first desired speed NED1 that is optimum for mowing) when the engine output OP is great. The engine speed can therefore be lowered to reduce noise and boost fuel efficiency during non-mowing operation.

Moreover, the operator is not required to regulate the engine speed manually. The operation is therefore simplified and stable operation can be achieved because no variance in engine speed is caused by manual regulation.

Further, the lawnmower engine speed control system according to this embodiment is configured to judge that mowing is being conducted when the engine output OP determined from the desired engine speed NED and the average speed fluctuation value NEFLUave is equal to or greater than the first predetermined engine output OP1 and to judge that mowing is not being conducted when the engine output OP is equal to or smaller than the second predetermined engine output OP2. Whether or not mowing is being conducted can therefore be judged with high accuracy.

Another feature of this embodiment is that the average speed fluctuation value NEFLUave is calculated first and the engine output OP is then determined using the calculated value. This prevents frequent changing of the desired engine speed NED (hunting) during mowing that involves large load fluctuation.

The first and second embodiments are thus configured to have a system for controlling a speed of an internal combustion engine (18) mounted on a lawnmower (10), comprising: an actuator (electric motor 56) moving a throttle valve (50) installed at an air intake passage (34) of the engine; a controller (ECU 64) controlling operation of the actuator such that the engine speed (NE) becomes equal to a predefined desired engine speed (NED); a determiner (S20 to S28, S110 to S118) determining whether the lawnmower is under a mowing operation based on a value indicative of a load of the engine; and a desired engine speed changer (S22, S28, S112, S118) changing the desired engine speed based on a result of determination. Thus, by setting the desired engine speed during non-mowing operation (idling speed) lower than during mowing operation, the engine speed can be lowered during non-mowing operation to lower noise and increase fuel efficiency Moreover, the operator is not required to regulate the engine speed manually. The operation is therefore simplified and stable operation can be achieved because no variance in engine speed is caused by manual regulation.

Specifically, the determiner includes: a throttle opening detector (S10 to S14) detecting a degree of opening of the throttle valve (θTH, more precisely average throttle opening θTHave); and an operating rate calculator (S16, S18, S24) calculating an operating rate of the engine (OPrate) as the value indicative of the load of the engine, based on the detected degree of opening of the throttle valve and the desired engine speed; and determines that the lawnmower is under a moving operation when the calculated operating rate is equal to or greater than a predetermined value (OPrate1 or OPrate2). This configuration offers improved capability of accurately discriminating whether mowing is being conducted, in addition to the effects mentioned above.

Specifically, the operating rate calculator calculates the operating rate using a predetermined characteristic (illustrated in FIG. 4) set with respect to the detected degree of opening of the throttle valve (θTHave) and the desired engine speed (NED1 or NED2).

Specifically, the characteristic is set such that the operating rate increases as the detected degree of opening of the throttle valve increases.

Specifically, the throttle opening detector detects the degree of opening of the throttle valve by calculating an average of prescribed number of detected degrees of opening of the throttle valve (θTHave).

Specifically, the determiner includes: an engine speed detector (crankangle sensor 62, ECU 64) detecting the engine speed NE; a speed fluctuation value calculator (S100, S102) calculating a speed fluctuation value of the engine (NEflu, more precisely average speed fluctuation value NEFLUave) based on the detected engine speed; and an engine output calculator (S106, S108, S116) calculating an output of the engine (OP) as the value indicative of the load of the engine, based on the calculated speed fluctuation value and the desired engine speed; and determines that the lawnmower is under a moving operation when the calculated output of the engine is equal to or greater than a predetermined value (OP1 or OP2). This configuration offers improved capability of accurately discriminating whether mowing is being conducted, in addition to the effects mentioned above.

Specifically, the engine output calculator calculates the output of the engine using a predetermined characteristic (illustrated in FIG. 7) set with respect to the calculated speed fluctuation value (NEFLUave) and the desired engine speed (NED 1 or NED2).

Specifically, the characteristic is set such that the output of the engine (OP) increases as the calculated speed fluctuation value increases.

Specifically, the speed fluctuation value calculator calculates the speed fluctuation value by calculating an average of prescribed number of calculated speed fluctuation values (NEFLUave). Specifically, the engine (18) is a single-cylinder engine.

Although the motor 56 is used as the actuator for driving the throttle valve 50 in the foregoing embodiments, any of various other actuators capable of being controlled by the ECU for regulating the opening of the throttle valve can be used instead.

The numerical values indicating engine speed and the like in the foregoing description are merely examples and are not to be construed as limiting the invention.

Japanese Patent Application No. 2003-183167 filed on Jun. 26, 2003, is incorporated herein in its entirety.

While the invention has thus been shown and described with reference to specific embodiments, it should be noted that the invention is in no way limited to the details of the described arrangements changes and modifications may be made without departing from the scope of the appended claims.

What is claimed is:

1. A speed control system, comprising:
a lawnmower;
an internal combustion engine mounted on said lawnmower;
an actuator moving a throttle valve installed at an air intake passage of the engine;
a controller controlling operation of the actuator such that the engine speed becomes equal to a predefined desired engine speed;
a determiner determining whether the lawnmower is under a mowing operation based on a value indicative of a load of the engine; and
a desired engine speed changer changing the desired engine speed based on a result of determination,
wherein the determiner includes:
a throttle opening detector detecting a degree of opening of the throttle valve; and
an operating rate calculator calculating an operating rate of the engine as the value indicative of the load of the engine, based on the detected degree of opening of the throttle valve and the desired engine speed;
and determines that the lawnmower is under a moving operation when the calculated operating rate is equal to or greater than a predetermined value.

2. The system according to claim 1, wherein the operating rate calculator calculates the operating rate using a predetermined characteristic set with respect to the detected degree of opening of the throttle valve and the desired engine speed.

3. The system according to claim 2, wherein the characteristic is set such that the operating rate increases as the detected degree of opening of the throttle valve increases.

4. The system according to claim 1, wherein the throttle opening detector detects the degree of opening of the throttle valve by calculating an average of prescribed number of detected degrees of opening of the throttle valve.

5. A speed control system, comprising:
a lawnmower;
an internal combustion engine mounted on said lawnmower;
an actuator moving a throttle valve installed at an air intake passage of the engine;
a controller controlling operation of the actuator such that the engine speed becomes equal to a predefined desired engine speed;
a determiner determining whether the lawnmower is under a mowing operation based on a value indicative of a load of the engine; and
a desired engine speed changer changing the desired engine speed based on a result of determination,
wherein the determiner includes:
an engine speed detector detecting the engine speed;
a speed fluctuation value calculator calculating a speed fluctuation value of the engine based on the detected engine speed; and
an engine output calculator calculating an output of the engine as the value indicative of the load of the engine, based on the calculated speed fluctuation value and the desired engine speed;
and determines that the lawnmower is under a moving operation when the calculated output of the engine is equal to or greater than a predetermined value.

6. The system according to claim 5, wherein the engine output calculator calculates the output of the engine using a predetermined characteristic set with respect to the calculated speed fluctuation value and the desired engine speed.

7. The system according to claim 6, wherein the characteristic is set such that the output of the engine increases as the calculated speed fluctuation value increases.

8. The system according to claim 5, wherein the speed fluctuation value calculator calculating the speed fluctuation value by calculating an average of prescribed number of calculated speed fluctuation values.

9. The system according to claim 5, wherein the engine is a single-cylinder engine.

10. A speed control method, comprising the steps of:
determining whether a lawnmower is under a mowing operation based on a value indicative of a load of an internal combustion engine mounted on said lawnmower; and
changing the desired engine speed based on a result of determination,
wherein an actuator moving a throttle valve is installed at an air intake passage of the engine and a controller controls operation of the actuator such that the engine speed becomes equal to a predefined desired engine speed,
wherein the step of determining includes the steps of:
detecting a degree of opening of the throttle valve; and
calculating an operating rate of the engine as the value indicative of the load of the engine, based on the detected degree of opening of the throttle valve and the desired engine speed; and
determines that the lawnmower is under a moving operation when the calculated operating rate is equal to or greater than a predetermined value.

11. The method according to claim 10, wherein the step of operating rate calculation calculates the operating rate using a predetermined characteristic set with respect to the detected degree of opening of the throttle valve and the desired engine speed.

12. The method according to claim 11, wherein the characteristic is set such that the operating rate increases as the detected degree of opening of the throttle valve increases.

13. The method according to claim 10, wherein the step of throttle opening detecting detects the degree of opening of the throttle valve by calculating an average of prescribed number of detected degrees of opening of the throttle valve.

14. A speed control method, comprising the steps of:
determining whether a lawnmower is under a mowing operation based on a value indicative of a load of an internal combustion engine mounted on said lawnmower; and
changing the desired engine speed based on a result of determination,
wherein an actuator moving a throttle valve is installed at an air intake passage of the engine and a controller controls operation of the actuator such that the engine speed becomes equal to a predefined desired engine speed,
wherein the step of determining includes the steps of:
detecting the engine speed;
calculating a speed fluctuation value of the engine based on the detected engine speed; and
calculating an output of the engine as the value indicative of the load of the engine, based on the calculated speed fluctuation value and the desired engine speed; and
determines that the lawnmower is under a moving operation when the calculated output of the engine is equal to or greater than a predetermined value.

15. The method according to claim 14, wherein the step of engine output calculation calculates the output of the engine using a predetermined characteristic set with respect to the calculated speed fluctuation value and the desired engine speed.

16. The method according to claim 15, wherein the characteristic is set such that the output of the engine increases as the calculated speed fluctuation value increases.

17. The method according to claim 14, wherein the step of speed fluctuation value calculation calculating the speed fluctuation value by calculating an average of prescribed number of calculated speed fluctuation values.

18. The method according to claim 14, wherein the engine is a single-cylinder engine.

* * * * *